US005780092A

United States Patent [19]
Agbo et al.

[11] Patent Number: 5,780,092
[45] Date of Patent: Jul. 14, 1998

[54] FOAMING COFFEE CREAMER AND INSTANT HOT CAPPUCCINO

[75] Inventors: Francis Agbo. Warwick. N.Y.;
Kozaburo Mori. Suzuja. Japan;
Tetsuya Goto. Syzuka. Japan; Kenneth W. Cale. Yorktown Heights. N.Y.;
Twyla L. Stubblefield. South Nyack. N.Y.; Anna C. Dal Monte. Port Chester, N.Y.

[73] Assignee: Kraft Foods, Inc., Northfield. Ill.

[21] Appl. No.: 800,823

[22] Filed: Feb. 14, 1997

Related U.S. Application Data

[63] Continuation of Ser. No. 305,925, Sep. 16, 1994, abandoned.

[51] Int. Cl.$^6$ .............................. A23C 1/04; A23G 1/00
[52] U.S. Cl. .................. 426/569; 426/570; 426/591; 426/594
[58] Field of Search .................. 426/650, 561, 426/594, 569, 570, 591

[56] References Cited

U.S. PATENT DOCUMENTS

| | | |
|---|---|---|
| 3,241,977 | 3/1966 | Mitchell et al. ............... 99/79 |
| 3,888,998 | 6/1975 | Sampson et al. . |
| 4,046,926 | 9/1977 | Gardiner . |
| 4,092,438 | 5/1978 | Tonner . |
| 4,316,916 | 2/1982 | Adamer . |
| 4,374,155 | 2/1983 | Igoe et al. . |
| 4,414,198 | 11/1983 | Michaelson . |
| 4,438,147 | 3/1984 | Hedrick, Jr. . |
| 4,450,182 | 5/1984 | Stahl et al. . |
| 4,746,527 | 5/1988 | Kuypers . |
| 4,748,040 | 5/1988 | Kuypers . |
| 4,752,465 | 6/1988 | Machles ............... 424/45 |
| 4,760,138 | 7/1988 | So et al. . |
| 5,013,576 | 5/1991 | Nakazawa et al. . |
| 5,350,591 | 9/1994 | Canton . |

FOREIGN PATENT DOCUMENTS 57-039741A  3/1982  Japan .

*Primary Examiner*—Cynthia L. Nessler
*Attorney, Agent, or Firm*—Thomas A. Marcoux; Thomas R. Savoie

[57] ABSTRACT

A particulate dry mix foaming creamer comprises a conventional particulate creamer for coffee beverages and the like together with a foam generating component comprising a food grade acidulant and an alkali metal carbonate or bicarbonate. A dry mix instant hot cappuccino product in accordance with the invention comprises a water soluble coffee component, the foam generating component, an optional creamer component, and an optional sweetener component. Cappuccino beverages are prepared by mixing a liquid component and the dry mix composition and heating. The liquid component may comprise milk or water. Heating, preferably microwave heating, may be carried out by pre-heating the liquid component or by heating after addition of the liquid component, or by a combination of these heating techniques.

26 Claims, No Drawings

FOAMING COFFEE CREAMER AND INSTANT HOT CAPPUCCINO

This application is a continuation of application Ser. No. 08/305,925, filed Sep. 16, 1994, now abandoned.

BACKGROUND OF THE INVENTION

The invention relates to dry mix instant hot cappuccino products, to foaming coffee creamers, and to methods of preparing hot cappuccino beverages.

Conventional dry mix instant hot cappuccino compositions include a coffee component, a foaming creamer component, an optional sweetener component, together with other optional components such as flavor, color, and foam stabilizer components. The compositions are normally provided as a particulate powder or granular composition. A hot cappuccino beverage is prepared by dissolving the instant cappuccino composition in a hot liquid such as hot water or hot milk. Sweetener, if not present in the composition, is normally added when the beverage is prepared. Hot cappuccino beverages have a substantial and characteristic foam on the top surface of the beverage. In the case of a brewed cappuccino, the foam is usually provided by steamed milk. In an instant cappuccino product, the foam is provided by a particulate, dry mix foaming creamer. Conventional foaming creamers are disclosed in U.S. Pat. No. 4,938,147, U.S. Pat. No. 4,746,527 and U.S. Pat. No. 4,748,040. The foaming creamers have a gas incorporated in the matrix which is incorporated into the creamer during its preparation. As a result, the density of the creamer is reduced, typically to provide a bulk density of about 0.10–0.4 g/cc. The amount of foam produced by the creamer depends on the amount of gas that is incorporated into the creamer. There is a finite limit to the amount of gas that can be incorporated into a gasified creamer. Moreover, as the amount of incorporated gas is increased, the creamer particles become more fragile and will lose some foaming ability if the fragile particles are broken. In addition, there is a limit on the amount of creamer that can be used to make an acceptable hot cappuccino beverage. Thus, there are definite limits on the amount of foam that can be provided by incorporating a foaming creamer in a hot cappuccino beverage.

It is an object of the invention to provide a dry mix instant hot cappuccino composition which does not require a gasified foaming creamer for creating a characteristic cappuccino foam.

It is a further object of the invention to increase the amount of foam produced by a foaming creamer.

It is a further object of the invention to provide a particulate dry mix foaming creamer which does not require incorporation of a gas for creating a characteristic cappuccino foam.

It is a further object of the invention to provide new methods of preparation of hot cappuccino beverages.

BRIEF SUMMARY OF THE INVENTION

A particulate dry mix foaming creamer in accordance with the invention comprises a conventional particulate creamer for coffee beverages and the like together with a foam generating component comprising a food grade acidulant and an alkali metal carbonate or bicarbonate.

A dry mix instant hot cappuccino composition in accordance with the invention comprises a water soluble coffee component, a foam generating component, an optional creamer component, an optional sweetener component, and, optionally, other minor ingredients such as foam stabilizers, color, flavor, and the like. The foam generating component comprises a food-grade acidulant and an alkali metal carbonate or bicarbonate.

A preferred method of preparing a hot cappuccino beverage in accordance with the invention comprises admixing a dry mix component comprising a water soluble coffee component and a foam generating component which comprises a food grade acidulant and a carbonate or bicarbonate with a liquid component which is suitably milk or water, the dry mix component further comprising a creamer when the liquid component is water, and heating the admixture to cause the foam generating component to generate foam. Heating is preferably effected by heating the admixture in a microwave oven, but may be effected by pre-heating the liquid component.

DESCRIPTION OF PREFERRED EMBODIMENTS

All amounts given in percent herein are in percent by weight, unless otherwise stated.

The coffee component in the instant dry mix cappuccino composition comprises soluble coffee solids. Conventional spray dried instant coffee is preferred, but any type of powdered or granular dry soluble coffee solids may be employed. The composition may also include chocolate or other flavor ingredients which are intended to modify the coffee flavor of the cappuccino beverage. The amount of the coffee component in the composition will vary considerably depending on the desired flavor. For an individual serving, the amount of the coffee component will generally from 0.75 to 5 grams, preferably 1–4 grams.

The food grade acidulant of the foam-generating component is solid at temperatures of up to at least about 150° F., soluble in hot water, preferably provided in particulate form, and can be any food grade acidulant capable of neutralizing the carbonate or bicarbonate component and of causing, in a hot cappuccino beverage prepared from the composition, a pH of from 5.5 to 7. Preferred food grade acidulants include alkali metal acid pyrophosphates, mono calcium phosphate, citric acid and gluconolactone or food grade salts thereof. Less preferred food grade acidulants include organic acids such as malic, fumaric, lactic, formic and tartaric and acidic food grade gums such as gum arabic, low methoxy pectin and modified cellulose gums. The term "food grade acidulant" as used herein is intended to include food grade salts thereof.

The amount of food grade acidulant in the dry mix instant cappuccino composition is generally an amount sufficient to neutralize the carbonate or bicarbonate and which will result in a pH of from 5.5 to 7 in a cappuccino beverage prepared from the composition. The required amount of acidulant depends, of course, on the amount of bicarbonate, the acidity of the system in the absence of the acidulant, the strength of the acidulant, etc. For gluconolactone and acid food gums, an amount of from about 0.035 to 3.5 parts, preferably 0.075 to 1 part, by weight of acidulant per part by weight of soluble coffee is suitable. For the other food grade acidulants mentioned above, a generally lesser amount of from 0.01 to 1 part, preferably from 0.025 to 0.4 parts by weight of acidulant per part by weight of soluble coffee is suitable. For an individual serving containing 0.75–5 grams of soluble coffee, a suitable amount of gluconolactone or acid food gum is from 0.15 to 2.5 grams and a suitable amount of the other listed food grade acidulants is from 0.05 to 0.7 grams.

The carbonate or bicarbonate of the foam-generating component is soluble in hot water, solid at temperatures of up to at least about 150° F., preferably provided in particulate form, is preferably a bicarbonate and is more preferably potassium bicarbonate. A sodium salt may also be used but the potassium salt can be used in a greater amount without an adverse effect on beverage flavor.

The carbonate or bicarbonate component is suitably present in an amount of 0.01 to 1.0 parts by weight, preferably 0.025 to 0.33 parts by weight, per part by weight of the soluble coffee component. For an individual serving containing from 0.75 to 5 grams of soluble coffee, 0.05 to 0.7 grams of the carbonate or bicarbonate is suitable.

The optional creamer component of the dry mix instant cappuccino composition or of a foaming creamer in accordance with the invention may be any conventional particulate creamer suitable for coffee beverages and the like. The creamer component may be of the non-dairy or dairy type, may be of the foaming or non-foaming type, and may be any combination of these types. For example, the creamer component may be made up of a non-foaming non-dairy creamer together with a foaming dairy creamer, a foaming non-dairy creamer together with a non-foaming dairy creamer, etc. The expression "dairy creamer" as used herein means a creamer which contains whole milk solids or whole milk solids having a reduced content of milk fat. The expression "non-dairy creamer" as used herein means a creamer which contains no appreciable quantity of milk-derived ingredients.

The optional creamer component of the dry mix composition, if present, is preferably present in an amount of from 1 to 20 parts by weight, preferably from 1–10 parts by weight, per part by weight of the coffee component.

A foaming creamer in accordance with the invention comprises a creamer component together with a foam generating component comprising the food grade acidulant and the carbonate or bicarbonate components described above. These foaming creamers can be used with soluble coffee products or with brewed coffee.

The amount of the food grade acidulant in a foaming creamer in accordance with the invention is generally 1–35% based on the creamer weight. For an acidulant such as citric acid, an amount of about 1–10%, based on the creamer weight, is suitable. Where gluconolactone or an acidic gum is employed, the amount of acidulant is about 3.5 times higher, suitably in the range of 3.5–35% based on creamer weight.

The amount of the bicarbonate or carbonate in a foaming creamer in accordance with the invention is generally 1–10% based on the creamer weight. Where the creamer component is of the non-foaming type, the amount of the bicarbonate or carbonate is preferably from 4–10%, based on the creamer weight. With foaming creamers, the amount of bicarbonate or carbonate is preferably 1–6%, based on the creamer weight.

A foaming creamer product in accordance with the invention may be packaged for an individual beverage serving or for multiple beverage servings. For an individual serving, the amount of the creamer is preferably about 3–20 grams and more preferably about 5–15 grams.

A sweetener component is optional in the present instant hot cappuccino formulation. If present, it is present in an amount sufficient to provide sweetness appropriate for a hot cappuccino beverage. Natural sugar sweeteners such as granulated sucrose are preferred. Other sugars may, however, be employed, either alone or in combination with sucrose. An artificial sweetener may also be employed in an amount which depends on the sucrose equivalence, provided that it will be effective in a hot cappuccino beverage. Where sucrose is employed as the sole sweetener in the hot cappuccino composition, an amount of from 1 to 20 parts by weight, per part by weight of the coffee component, is suitable and an amount of 1 to 8 parts per weight per part by weight of the coffee component is preferred. Where a different sweetener is utilized either alone or in combination with sucrose, it is preferably employed in an amount such that the sweetness of the sweetener component is equivalent to the amount of sucrose mentioned above. Thus, it is preferred that a beverage prepared from a sweetened hot cappuccino composition in accordance with the invention has a sweetness within the range of sweetness that would result from the use in the composition of sucrose alone in the amount mentioned above.

A foam stabilizer can also be incorporated in an amount sufficient to reduce foam loss as a function of time. In general, an amount of stabilizer of 0.1 to 5% based on the weight of the coffee component is suitable. Several foam stabilizers suitable for use in the present invention are known for use in connection with conventional gasified foaming creamers such as those described in the U.S. patents mentioned above, such as sodium caseinate, emulsifiers, and hydrocolloids, either alone or in combination.

The composition may also include other components normally employed in instant hot cappuccino compositions such as flavoring, coloring, silicon dioxide, buffers such as trisodium citrate, and the like. It is preferred to keep the composition free of added fiber or other ingredients not normally utilized in instant hot cappuccino compositions.

Cappuccino beverages are prepared from the dry mix composition in several ways. Where the composition does not include a creamer component, a separate creamer component may be employed and the beverage prepared by adding the creamer component and hot water or by adding the creamer component and water and then heating, preferably in a microwave oven, or by a combination of these methods. Alternatively, the cappuccino beverage may be prepared without a creamer component by adding hot milk or by adding milk and heating, preferably in a microwave oven. Combinations of these techniques can also be employed such as by employing a reduced amount of creamer component and adding water and milk. The milk can be whole milk or milk which is reduced in milk fat content such as skim milk or milk containing 1% or 2% milk fat. A preferred technique for preparing the beverage is to add milk, preferably at a refrigeration temperature, typically in the range of 35°–50° F., to the dry mix composition with stirring and without the use of a creamer component and to heat the beverage to a temperature of about 140°–190° F., preferably by heating in a microwave oven under conditions such that the target temperature is reached within three minutes, preferably with two minutes, in order to generate a good cappuccino beverage foam. Conventional home microwave ovens operating at 400 to 800 watts and a wavelength of 2450 Mhz are suitable. The milk preferably has a milk fat content which is not in excess of 2%. The serving size of the coffee component in this preferred embodiment is from 0.75 to 5 grams of soluble coffee per serving of beverage (4 to 8 fluid ounces of beverage). When the dry mix composition includes a creamer, a hot cappuccino beverage can be prepared by adding water and heating. Heating can be effected either before or after adding the water and such heating is preferably effected in a microwave oven.

Preferred compositions are of single serving size, containing from 0.75 to 5 grams of soluble coffee, and are preferably of three types: compositions containing neither creamer or sweetener; compositions containing a sweetener but no creamer; and compositions containing both creamer and sweetener. Each of these preferred individual serving compositions contains an amount of food grade acidulant sufficient to neutralize the carbonate or bicarbonate and to obtain a beverage pH of 5.5 to 7. Where a sucrose sweetener is employed, it is preferably employed in an amount of from 1–20 parts by weight, preferably from 1–10 parts by weight, per part by weight of soluble coffee. Where other sweeteners are employed, the amount of sweetener is preferably equivalent to the sweeteners that would be achieved by employing sucrose as the sole sweetener in the weight range mentioned above. Where a creamer is employed, it is preferably employed in an amount of from 1–20 parts by weight, preferably from 1–8 parts by weight, per part by weight of soluble coffee.

COMPARISON EXAMPLE 1

To 250 ml of water at a temperature of 180°–190° F. is added with stirring 6.8 grams of a commercial foaming dairy creamer having a fat content of 17% by weight and a density of 0.15 g/cc. Foam height is observed immediately (within 15 seconds of preparation) and three and five minutes thereafter. Foam height is observed after pouring the preparation into a graduated cylinder having a diameter of 6 cm. Foam height is given in Table I.

EXAMPLE 1

Comparison Example 1 is followed except that 0.375 grams of potassium bicarbonate and 0.225 grams of citric acid are also added to the hot water. Foam height is given in Table I.

COMPARISON EXAMPLES 2, 3 AND 4

Comparison Example 1 is followed except that the creamers are of the non-foaming type. In Comparison Example 2, the creamer is a dairy type creamer and is the same as that of Comparison Example 1 except that it is non-aerated and has a density of 0.55 g/cc. In Comparison Example 3, the creamer is a non-dairy creamer having a fat content of 38% fat and a density of 0.53 g/cc. In Comparison Example 4, the creamer is a non-dairy creamer having a fat content of 75% and a density of 0.37 g/cc. Foam height is reported in Table I.

EXAMPLES 2A, 2B, 3A, 3B AND 4

These examples are the same, respectively, as Comparison Examples 2, 3 and 4 except that bicarbonate and acid are included with the creamer in the amounts shown in Table I. Foam height is reported in Table I.

TABLE I

| FOAM HEIGHT WITH VARIOUS CREAMERS | | | | | | |
|---|---|---|---|---|---|---|
| EXAM- | CREAMER | KHCO$_3$ | ACID | FOAM HEIGHT (mm) | | |
| PLE | Type[1] | (gms) | (gms) | (15 sec) | (3 min) | (5 min) |
| CX 1 | FD | — | — | 11 | 10 | 10 |
| 1 | FD | .375 | .225 | 25 | 13 | 11 |
| CX 2 | NFD | — | — | 4 | 4 | 4 |
| 2A | NFD | .375 | .225 | 8 | 6 | 5 |
| 2B | NFD | .5 | .3 | 19 | 6 | 5 |
| CX 3 | NFND$_1$ | — | — | 4 | 4 | 3 |
| 3A | NFND$_1$ | .375 | .225 | 10 | 5 | 5 |
| 3B | NFND$_1$ | .5 | .3 | 11 | 6 | 6 |

TABLE I-continued

| FOAM HEIGHT WITH VARIOUS CREAMERS | | | | | | |
|---|---|---|---|---|---|---|
| EXAM- | CREAMER | KHCO$_3$ | ACID | FOAM HEIGHT (mm) | | |
| PLE | Type[1] | (gms) | (gms) | (15 sec) | (3 min) | (5 min) |
| CX 4 | NFND$_2$ | — | — | 3 | 3 | 3 |
| 4 | NFND$_2$ | .375 | .225 | 9 | 5 | 5 |

[1]FD denotes a foaming, dairy creamer.
NFD denotes a non-foaming dairy creamer.
NFND denotes a non-foaming, non-dairy creamer: the. subscripts denote different types.

It will be seen from the foregoing examples that the addition of a bicarbonate/acid system improves the foaming characteristics of each type of creamer. The Examples which follow illustrate that similar results are achieved in coffee products, and particularly in instant hot cappuccino products.

COMPARISON EXAMPLE 5

A hot cappuccino beverage is prepared by adding 22 grams of a dry mix instant hot cappuccino composition to 250 ml of water at a temperature of 180°–190° F. with stirring. The dry mix contains 3.6 grams of soluble coffee, 6.8 grams of a commercial foaming (aerated) dairy creamer containing 17% fat, 11 grams of sucrose, and minor amounts of flavors and buffers, and has a density of 0.15 g/cc. Foam height is reported in Table III.

EXAMPLE 5

The procedure of Comparison Example 5 is followed except that 0.375 grams of potassium bicarbonate and 0.225 grams of citric acid are added to the coffee composition. Foam height is improved as reported in Table III.

The instant cappuccino products of Example 5 and Comparison Example 5 were subjected to consumer tests. Using a rating scale of 1–9, 151 consumers were asked to evaluate several aspects of the products. Results are reported in Table II.

TABLE II

| PRODUCT | PRODUCT RATINGS RESULTS* | | |
|---|---|---|---|
| Characteristics | Comp. Ex. 5 | Ex. 5 | |
| Appearance Liking | 6.0 | 6.9 | Ex. 5 is preferred for appearance. |
| Amount of Foam | 5.0 | 7.1 | Ex. 5 has more foam. |
| Flavor Liking | 5.6 | 6.2 | Ex. 5 is preferred for flavor. |
| Degree of Sweetness | 4.9 | 5.3 | No difference. |
| Strength of Coffee Flavor | 5.6 | 5.5 | No difference. |
| Degree of Creaminess | 4.6 | 5.8 | Ex. 5 is more creamy. |
| Overall Liking | 5.7 | 6.3 | Ex. 5 is preferred overall. |

*Based on statistical significance at 95% confidence.

Note: First row "Characteristics" column actually reads "Ex. 5 is preferred for appearance."

COMPARISON EXAMPLE 6

To 250 ml of brewed coffee is added 6.8 grams of the same foaming dairy creamer of Comparison Example 5. Foam height is reported in Table III.

EXAMPLE 6

The procedure of Comparison Example 6 is followed, except that 0.375 grams of potassium bicarbonate and 0.225 grams of citric acid are included in the coffee beverage. Foam height is reported in Table III.

COMPARISON EXAMPLE 7

Comparison Example 5 is followed except that the same creamer is employed but is not aerated and has a density of 0.55 g/cc. Foam height is reported in Table III.

EXAMPLES 7A AND 7B

In Example 7A, Comparison Example 7 is followed except that 0.375 grams of potassium bicarbonate and 0.225 grams of citric acid are included in the pre-mix. Example 7B is the same except that the amount of potassium bicarbonate is increased to 0.5 grams and the amount of citric acid is increased to 0.3 grams. Foam height is reported in Table III.

COMPARISON EXAMPLE 8

To 250 ml of brewed coffee is added 6.5 grams of the non-foaming creamer of Comparison Example 3. Foam height is reported in Table III.

EXAMPLES 8A AND 8B

In Example 8A, Comparison Example 8 is followed except that 0.375 grams of potassium bicarbonate and 0.225 grams of citric acid are added to the brewed coffee. Example 8B is the same except that the amount of potassium bicarbonate is increased to 0.5 grams and the amount of citric acid is increased to 0.3 grams. Foam height is reported in Table III.

grams of citric acid are included in the coffee dry mix. Example 9B is the same except that the amount of bicarbonate is increased to 0.5 grams and the amount of citric acid is increased to 0.3 grams. Foam height is reported in Table III.

COMPARISON EXAMPLE 10

To 250 ml of brewed coffee is added 6.8 grams of the same non-foaming, non-dairy creamer of Comparison Example 9. Foam height is given in Table III.

EXAMPLE 10

Comparison Example 10 is followed except that 0.5 grams of potassium bicarbonate and 0.3 grams of citric acid are added to the brewed coffee. Foam height is reported in Table III.

EXAMPLES 11–13

Examples 7A, 7B and 8B, respectively, are followed except that the creamer is a further commercial non-dairy, non-foaming creamer containing 75% fat and having a density of 0.37 g/cc. Foam height is reported in Table III.

TABLE III

FOAM HEIGHT WITH VARIOUS CREAMERS AND VARIOUS COFFEE PRODUCTS

| EX. | COFFEE Type | CREAMER Type[1] | $KHCO_3$ (gms) | ACID (gms) | FOAM HEIGHT (mm) (15 sec) | (3 min) | (5 min) |
|---|---|---|---|---|---|---|---|
| CX 5 | Instant | FD | — | — | 10 | 9 | 9 |
| 5 | Instant | FD | .375 | .225 | 29 | 12 | 11 |
| CX 6 | Brewed | FD | — | — | 9 | 9 | 9 |
| 6 | Brewed | FD | .375 | .225 | 30 | 12 | 11 |
| CX 7 | Instant | NFD | — | — | 1 | 1 | 0 |
| 7A | Instant | NFD | .375 | .225 | 11 | 7 | 6 |
| 7B | Instant | NFD | .5 | .3 | 19 | 6 | 6 |
| CX 8 | Brewed | NFD | — | — | 4 | 2 | 2 |
| 8A | Brewed | NFD | .375 | .225 | 10 | 5 | 4 |
| 8B | Brewed | NFD | .5 | .3 | 22 | 8 | 6 |
| CX 9 | Instant | $NFND_1$ | — | — | 1 | 1 | 0 |
| 9A | Instant | $NFND_1$ | .375 | .225 | 7 | 5 | 5 |
| 9B | Instant | $NFND_1$ | .5 | .3 | 13 | 5 | 5 |
| CX 10 | Brewed | $NFND_1$ | — | — | 0 | 0 | 0 |
| 10 | Brewed | $NFND_1$ | .5 | .3 | 17 | 6 | 5 |
| 11 | Instant | $NFND_2$ | .375 | .225 | 7 | 4 | 4 |
| 12 | Instant | $NFND_2$ | .5 | .3 | 23 | 6 | 5 |
| 13 | Brewed | $NFND_2$ | .5 | .3 | 24 | 5 | 6 |

[1]FD denotes a foaming, dairy creamer.
NFD denotes a non-foaming dairy creamer.
NFND denotes a non-foaming, non-dairy creamer.
subscripts denote different types.

COMPARISON EXAMPLE 9

Comparison Example 7 is followed except that the creamer is a commercial non-foaming, non-dairy creamer containing 38% fat and having a density of 0.53 g/cc. Foam height is reported in Table III.

EXAMPLES 9A AND 9B

In Examples 9A, Comparison Example 9 is followed except that 0.375 grams of potassium bicarbonate and 0.225

COMPARISON EXAMPLES 11–14

Hot coffee beverages are prepared by adding about 22 grams of each of four coffee products to about 237 ml of hot water as in Comparison Example 11. The commercial products tested are:

COMPARISON EXAMPLE 11

A commercial coffee-flavored instant cappuccino product (Maxwell House "Hot Cappuccino") containing a commercial foaming dairy creamer "A" which is manufactured from water, lactose, disodium phosphate, sodium caseinate, non-fat dry milk solids and soybean oil.

COMPARISON EXAMPLE 12

Comparison Example 11, but employing a different commercial aerated foaming dairy creamer, "B" which differs from creamer "A" in that concentrated skim milk is utilized in the formulation.

COMPARISON EXAMPLE 13

Comparison Example 11, but employing a commercial non-dairy foaming creamer, "C" which is manufactured from water, lactose, corn syrup solids, palm kernel oil, caseinate, soy protein, flavors, and stabilizer.

COMPARISON EXAMPLE 14

A commercial instant coffee product containing the foaming creamer of Comparison Example 13.

Foam height is measured as described above. Results are given in Table IV.

EXAMPLES 14–17

Comparison Examples 11–14 are followed, respectively, except that, in each, 0.5 grams of potassium bicarbonate and 0.3 grams of citric acid are dry mixed with each of the commercial coffee products. Foam height is reported in Table IV.

TABLE IV

| EXAMPLE | FOAM HEIGHT IN MILLIMETERS TIME AFTER PREPARATION OF BEVERAGE | | |
|---|---|---|---|
| | 15 Seconds | 3 Minutes | 5 Minutes |
| Comp. Ex. 11 | 10 | 9.5 | 8.5 |
| Example 14 | 24 | 15 | 12 |
| Comp. Ex. 12 | 15 | 12 | 10 |
| Example 15 | 30 | 15 | 13 |
| Comp. Ex. 13 | 6 | 6 | 6 |
| Example 16 | 21 | 10 | 8 |
| Comp. Ex. 14 | 5 | 5 | 6 |
| Example 17 | 9 | 8 | 7 |

As shown in Table IV, in each instance the foam height increased from 80–300% when employing the foam-generating components of the present invention.

EXAMPLE 18

Comparison Example 5 is followed except that 0.1 grams of sodium bicarbonate and 0.06 grams of citric acid are incorporated into the mix. Initial foam height is 14 mm.

EXAMPLES 19–24

Soluble coffee and a foam-generating component in accordance with the invention were stirred into 8 ounces of fresh, refrigerated, homogenized milk in a glass beaker, the milk containing 2% milk fat. The beaker was placed in a conventional micro-wave oven of the type used in the home having an oven size of about one cubic feet and heated on high (approximately 700 watts) at 2450 MHz. Foam height was recorded as a function of time. Several different formulations were employed. Table V gives the formulations and foam height. Results are reported as the average of at least two runs.

TABLE V

| Example | Temperature of Mix Before MW/ After MW (°F./°F.) | Formulation | | | Foam Height | |
|---|---|---|---|---|---|---|
| | | Coffee (gms) | Bicarb[1] (gms) | Acid[2] (gms) | Time (m:s) | Height (mm) |
| 19 | 50/110 | 3.6 | .375 | .225 | 2:00 | 35.5 |
| 20 | 51/163 | 2.0 | .5 | .3 | 1:30 | 50+ |
| 21 | 53/150 | 4.0 | .25 | .15 | 1:30 | 50+ |
| 22 | 51/160 | 2.0 | .25 | .15 | 2:08 | 40+ |
| 23 | 54/145 | 2.0 | .375 | .225 | 2:00 | 46 |
| 24 | 52/134 | 2.0 | .7 | .42 | 1:30 | 46 |

[1]Potassium Bicarbonate.
[2]Citric Acid.

EXAMPLE 25

Individual servings of a particulate dry mix instant hot cappuccino composition were prepared by blending 3.6 grams of soluble coffee, 11 grams sugar, 0.3 grams of citric acid, 0.5 grams of potassium bicarbonate, and minor amounts of flavorings, buffers, and silicon dioxide. Individual rich, creamy, hot cappuccino beverage servings having a foam head were prepared by adding to the dry mix, with stirring, eight fluid ounces of milk pre-heated to 185° F. The beverages were evaluated by a group of 151 consumers who compared the beverage to commercially available coffee-flavored instant cappuccino products. The consumers reported a significant preference for the present beverage.

EXAMPLE 26

Example 25 is followed except that the individual beverages are prepared by adding refrigerated milk at a temperature of about 42° F., followed by heating in a microwave oven until the beverage reaches a temperature of about 180° F. The beverage is a rich, creamy cappuccino with a foam head.

What is claimed is:

1. A particulate dry mix foaming creamer composition comprising a gasified foaming beverage creamer capable of producing a cappuccino-type foam and a foam generating component comprising a food grade acidulant and an alkali metal carbonate or bicarbonate.

2. A particulate dry mix creamer composition according to claim 1, further comprising a non-foaming creamer.

3. A particulate dry mix creamer composition according to claim 1, wherein said gasified foaming creamer comprises a non-dairy creamer.

4. A particulate dry mix creamer composition according to claim 1, wherein said gasified foaming creamer comprises a dairy creamer.

5. A particulate dry mix creamer composition according to claim 1 which is free of added fiber.

6. A particulate dry mix creamer composition according to claim 1, wherein said food grade acidulant is present in an amount of from 1–35% by weight based on the weight of the creamer.

7. A particulate dry mix creamer composition according to claim 6, wherein said carbonate or bicarbonate is present in an amount of from 1–10% by weight based on the weight of the creamer.

8. An instant, particulate, dry mix hot cappuccino composition comprising a water soluble coffee component, a gasified foaming creamer component capable of producing a cappuccino-type foam, an optional sweetener component, and a foam-generating component, the foam-generating component comprising a food grade acidulant and an alkali metal carbonate or bicarbonate.

9. An instant hot cappuccino composition according to claim 8 wherein said food grade acidulant is present in an amount sufficient to neutralize the carbonate or bicarbonate and to result in a pH of from 5.5 to 7 in a cappuccino beverage prepared from the composition.

10. An instant hot cappuccino composition according to claim 8 further comprising a non-foaming creamer.

11. An instant hot cappuccino composition according to claim 8 wherein said food grade acidulant is present in an amount of from 0.01 to 1 parts by weight per part by weight of the coffee component, and wherein said carbonate or bicarbonate is present in an amount of from 0.01 to 1 parts by weight per part by weight of the coffee component.

12. An instant hot cappuccino composition according to claim 8 wherein said gasified foaming creamer is present in an amount of from 1 to 20 parts by weight per part by weight of said coffee component.

13. An instant hot cappuccino composition according to claim 8 wherein said gasified foaming creamer is present in an amount of from 1 to 10 parts by weight per part by weight of said coffee component.

14. An instant hot cappuccino composition according to claim 8 which is free of added fiber.

15. An instant hot cappuccino composition according to claim 8 containing, per serving from 0.75 to 5 grams of said coffee component, from 0.05 to 0.7 grams of said food grade acid, and from 0.05 to 0.7 grams of said carbonate or bicarbonate.

16. An instant hot cappuccino composition according to claim 15 further containing a sweetener in an amount equivalent to from 1 to 20 parts by weight of sucrose per part by weight of said coffee component.

17. An instant hot cappuccino composition according to claim 16 further containing a sweetener in an amount equivalent to from 1 to 10 parts by weight of sucrose per part by weight of said coffee component.

18. A method of preparing a cappuccino beverage which comprises: admixing a dry mix composition comprising a water soluble coffee component, a gasified foaming creamer capable of producing a cappuccino-type foam, and a foam generating component which comprises a food grade acidulant and an alkali metal carbonate or bicarbonate, with a liquid component selected from the group consisting of milk and water, and heating the admixture to cause the foam generating component to generate a foam which simulates the foam of a conventional brewed cappuccino beverage.

19. A method according to claim 18 wherein said instant hot cappuccino composition is free of added fiber.

20. A method according to claim 18 wherein the foam is generated by pre-heating the liquid component, prior to the admixing step to a temperature sufficient to cause generation of said foam.

21. A method according to claim 20 wherein said heating is effected in a microwave oven.

22. A method according to claim 18 wherein the foam is generated by first admixing the liquid component and dry mix composition and then heating the mixture to a temperature in the range of 140°–190° F.

23. A method according to claim 22 wherein the liquid component is at a temperature of from 35°–50° F. and wherein said heating is effected in a microwave oven.

24. A method according to claim 23 wherein said liquid component comprises refrigerated milk.

25. A method according to claim 22 where said liquid component is at ambient temperature.

26. A method according to claim 25 wherein said liquid component comprises water at a temperature of from 55°–85° F.

* * * * *